:::: {.cols}
(12) United States Patent
Bilak et al.

(10) Patent No.: US 11,414,273 B2
(45) Date of Patent: Aug. 16, 2022

---

(54) SYSTEM AND METHOD FOR COMPRESSED AIR ENERGY STORAGE

(71) Applicant: CLEANTECH GEOMECHANICS INC., Calgary (CA)

(72) Inventors: Roman A. Bilak, Calgary (CA); Maurice B. Dusseault, Calgary (CA)

(73) Assignee: CLEANTECH GEOMECHANICS INC., Calgary (CA)

( * ) Notice: Subject to any disclaimer, the term of this patent is extended or adjusted under 35 U.S.C. 154(b) by 0 days.

(21) Appl. No.: 16/982,168

(22) PCT Filed: Mar. 19, 2019

(86) PCT No.: PCT/CA2019/050331
§ 371 (c)(1),
(2) Date: Sep. 18, 2020

(87) PCT Pub. No.: WO2019/178679
PCT Pub. Date: Sep. 26, 2019

(65) Prior Publication Data
US 2021/0024290 A1 Jan. 28, 2021

Related U.S. Application Data

(60) Provisional application No. 62/644,696, filed on Mar. 19, 2018.

(51) Int. Cl.
*B65G 5/00* (2006.01)
*E21F 17/16* (2006.01)
(Continued)

(52) U.S. Cl.
CPC ............... *B65G 5/00* (2013.01); *E21F 17/16* (2013.01); *F17C 1/007* (2013.01); *F17C 5/06* (2013.01);
(Continued)

(58) Field of Classification Search
CPC .. B65G 5/00; E21F 17/16; F17C 1/007; F17C 5/06; F17C 2221/031; F17C 2223/035; E21B 41/0064; E21B 33/13; Y02C 20/40
See application file for complete search history.

(56) References Cited

U.S. PATENT DOCUMENTS 5,207,530 A * 5/1993 Brooks .................. F17C 1/007
405/53
5,333,465 A * 8/1994 McBride ................. F17C 1/007
137/264
(Continued)

FOREIGN PATENT DOCUMENTS

CN 106499612 A 3/2017
CN 106567748 A 4/2017
(Continued)

OTHER PUBLICATIONS

International Search Report for corresponding International Patent Application No. PCT/CA2019/050331, dated May 24, 2019, 3 pages.
(Continued)

*Primary Examiner* — Carib A Oquendo
(74) *Attorney, Agent, or Firm* — Klintworth & Rozenblat IP LLP (57) ABSTRACT

Storage vessel, system and method for storing compressed gas are provided. A storage vessel for storing compressed gas comprises a wellbore provided in the subsurface; a casing placed within the wellbore and cemented to the formation, the casing defining a volumetric space within the wellbore for storing the compressed gas; and at least one flow regulator sealed at a top end of the casing for selectively injecting the compressed gas into the space or discharging the compressed gas from the space, wherein the
(Continued)

::::

wellbore has a volumetric capacity of at least 20 m3, and wherein the compressed gas has a pressure of at least 5 MPa.

19 Claims, 4 Drawing Sheets

(51) Int. Cl.
*F17C 1/00* (2006.01)
*F17C 5/06* (2006.01)

(52) U.S. Cl.
CPC .. *F17C 2221/031* (2013.01); *F17C 2223/035* (2013.01)

(56) References Cited

U.S. PATENT DOCUMENTS

| | | | |
|---|---|---|---|
| 6,840,709 B2 | 1/2005 | Dahlem et al. | |
| 2002/0007953 A1 | 1/2002 | Liknes | |
| 2013/0061591 A1* | 3/2013 | Bove | F02C 6/16 60/645 |
| 2013/0336721 A1* | 12/2013 | McBride | E21D 11/00 405/55 |
| 2016/0318710 A1 | 11/2016 | Williams et al. | |
| 2018/0016984 A1* | 1/2018 | Deleau | F28F 21/04 |

FOREIGN PATENT DOCUMENTS

| | | |
|---|---|---|
| CN | 107461603 A | 12/2017 |
| EP | 801261 A2 | 10/1997 |

OTHER PUBLICATIONS

Davidson CL, et al. "Geothermally Coupled Well-Based Compressed Air Energy Storage," Pacific Northwest National Laboratory, Report PNNL-25171, Dec. 2015 [retrieved on Apr. 15, 2018 (Apr. 15, 2019]. Retrieved from the Internet <URL: https://www.pnnl.gov/main/publications/external/technical_reports/PNNL-25171 ,pdf> *entire document*.
Machine translation of EP 801261 A2.
Office Action for Chinese Application No. CN20198020929.1 dated Jun. 2, 2021, 9 pages.
Examination Report for GC Application No. 2019-37230 dated Jun. 27, 2021, 4 pages.
Examination Report for GC Application No. 2019-37230 dated Jul. 19, 2021, 4 pages.
English machine translation of CN 107461603A.
English machine translation of CN 106567748A.
English machine translation of CN 106499612A.

* cited by examiner

SYSTEM AND METHOD FOR COMPRESSED AIR ENERGY STORAGE

CROSS-REFERENCE TO RELATED APPLICATIONS

This application claims priority to U.S. provisional patent application Ser. No. 62/644,696, filed Mar. 19, 2018, which is hereby incorporated by reference in its entirety.

FIELD

The present application relates generally to energy storage and production, in particular to storage vessels, systems and methods for storing energy as compressed air, for delayed generation of electrical energy.

BACKGROUND

Compressed Air Energy Storage (CAES), Liquid Air Energy Storage (LAES), Sub-water bladder/hydrostatic CAES are examples of existing energy storage technologies.

CAES has been proposed for large, grid-scale CAES facilities (>50 MW) in salt caverns or aquifers which could serve to store waste or excess electrical energy for high peak demand periods. CAES technology at grid scale is currently used in Germany (Huntdorf) and United States (Macintosh AL), and at smaller scales in Toronto and several other locations. There are several modes of compressed air storage: caverns (e.g. dissolved caverns or old hard rock mines), porous permeable aquifers, Liquid Air Energy Storage (LAES), and sub-water bladders/hydrostatic.

However, with caverns and aquifers, the CAES facility is dependent on suitable geologic site settings; such as a subterranean salt cavern for cavern-type storage. This criterion limits the use and placement of CAES facilities—which can lead to significant transmission infrastructure costs to deliver dispatchable energy to the end-user. As well, due to the investment costs with cavern-type or aquifer-type CAES, these facilities are large scale operations, with limited scalability and applicability.

Liquid Air Energy Storage (LAES) may also be used to store energy, but it depends on a large surface footprint, complex processing, and multiple surface pressure tanks. Surface tanks have safety and size issues, and LAES is a low pressure process that constrains the energy output for a given storage vessel volume.

Sub-water bladder/hydrostatic CAES are again site specific and a low pressure process. Energy conversion efficiency is relatively low. With both the LAES and Sub-water bladder/hydrostatic CAES processes, there are continued issues with respect to limited scalability and applicability.

SUMMARY

The terms "well", and "storage vessel" are used interchangeably in this disclosure. The term "wellbore" means a hole that is drilled into the ground. A wellbore can subsequently be encased by materials such as steel and cement. In an embodiment, the present application discloses an underground energy storage vessel. The storage vessel is a wellbore encased with materials such as steel and cement that can sustain a high pressure and a high temperature. This application is referred to as Cased Wellbore Compressed Air Storage (CWCAS). The casing of the storage vessel has a depth of at least 500 meters. A wellbore is formed by drilling a borehole into the subsurface formations and a high grade steel casing is cemented into the wellbore, to a depth of typically 500 m to 1,500 m. The casing is completely sealed at the top and bottom. A high pressure wellhead caps the well, and allows for injection and flow-back of compressed air.

Compressed gas may be stored within an air-tight space defined within the cased well. A new storage vessel may be conveniently added by drilling and completing another cased wellbore to expand the storage capacity. An array of such storage vessels may be used to store the compressed gas.

In an embodiment, the present application also discloses an energy storage system for Cased-Wellbore Compressed Air Storage (CWCAS) comprising at least one storage vessel; a compressor in sealed, fluid communication with storage vessel for injecting gas within the cased wellbore up to a pressure of at least 5 MPa; and a generator in sealed, fluid communication with the cased wellbore for generating electricity from the discharge of the compressed gas from the well.

The storage vessel and the system are not site specific and may be located at almost any location. The energy storage capacity of the system may be easily expanded by drilling additional storage vessels. Furthermore, because the entire storage vessel is under the ground with in situ confinement from the surrounding rock layers, the storage vessel and the system may sustain pressures up to 100 MPa with negligible safety risk. The CWCAS system has significantly lower life-cycle environmental impacts than comparable battery storage systems.

According to an embodiment of the present application, there is provided a storage vessel for storing compressed gas, comprising: a wellbore provided in the subsurface; a casing placed within the wellbore (i.e. a cased wellbore) and cemented to the surrounding rock formations, the cased wellbore defining a space for storing the compressed gas; and at least one gas flow regulator sealed at a top end of the cased wellbore for selectively injecting the compressed gas into the space or discharging the compressed gas from the space, wherein the wellbore volume is at least 20 m$^3$, and wherein the compressed gas has a pressure of at least 5 MPa.

According to another embodiment of the present application, there is provided a system for storing energy in a form of compressed gas comprising: one or more energy storage vessels for storing compressed gas, at least one of the energy storage vessels comprising: a wellbore provided in the subsurface; a casing placed within the wellbore and cemented to the surrounding rock formations, the cased wellbore defining a space for storing the compressed gas; and at least one gas flow regulator sealed at a top end of the cased wellbore for selectively injecting the compressed gas into the space or discharging the compressed gas from the space, wherein the wellbore volume is at least 20 m$^3$, and wherein the compressed gas has a pressure of at least 5 MPa, at least one surface gas compressor in sealed, fluid communication with the one or more energy storage vessels for compressing the gas and for injecting the compressed gas therein; and at least one surface gas expander in sealed, fluid communication with the one or more energy storage vessels for generating electricity from the compressed gas discharged from one or more energy storage vessels.

According to another embodiment of the present application, there is provided a method for energy storage, comprising: forming at least one storage vessel by cementing a casing in a wellbore in the subsurface, compressing gas on the surface; and injecting compressed gas into the at least one storage vessel, and wherein the compressed gas has a pressure of at least 5 MPa.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Off-peak energy, excess energy, or irregular energy from renewable energy sources such as wind, solar, and tidal sources can be stored as compressed air (CA) until a need for additional energy is encountered. For example, on a warm sunny day in Ontario, solar and wind farms generate excess electrical energy, that is given away or sold well below cost because it cannot be consumed nor stored in Ontario.

Compressed air storage at smaller scales can help communities and industrial entities incorporate more renewable energy and save money at the same time. For example, if a remote mine installed a compressed air storage system to store excess energy in the form of compressed air during daylight hours when the wind blows, it would subsequently generate electrical energy by the compressed air for operations at other times. If an industrial complex or community is linked to the grid, energy stored in the compressed air could be converted to electrical energy and returned to the grid during peak periods to reduce energy costs of the industrial complex or community.

An example of energy storage potential is a large industrial complex. The complex may build a compressed air storage facility, install wind turbines that can provide energy at 3-4 ¢/kWh, and recharge the compressed air storage system with excess wind energy or with cheap, off-peak electrical energy in the middle of the night. During the day shifts, the compressed air system provides electrical energy to the industrial complex when to cost of grid supplied electrical energy is higher.

1-50 MWh compressed air storage systems may permit communities to be off-grid with their own renewable energy and energy storage capacity, without having all their energy and environmental decisions supplied by external agencies/utilities. A CWCAS system with wind and/or solar energy inputs could provide some or even most of the community's needs for electrical energy, allowing far greater autonomy in planning and decarbonizing energy systems by reducing fossil fuel needs.

Figure 1:
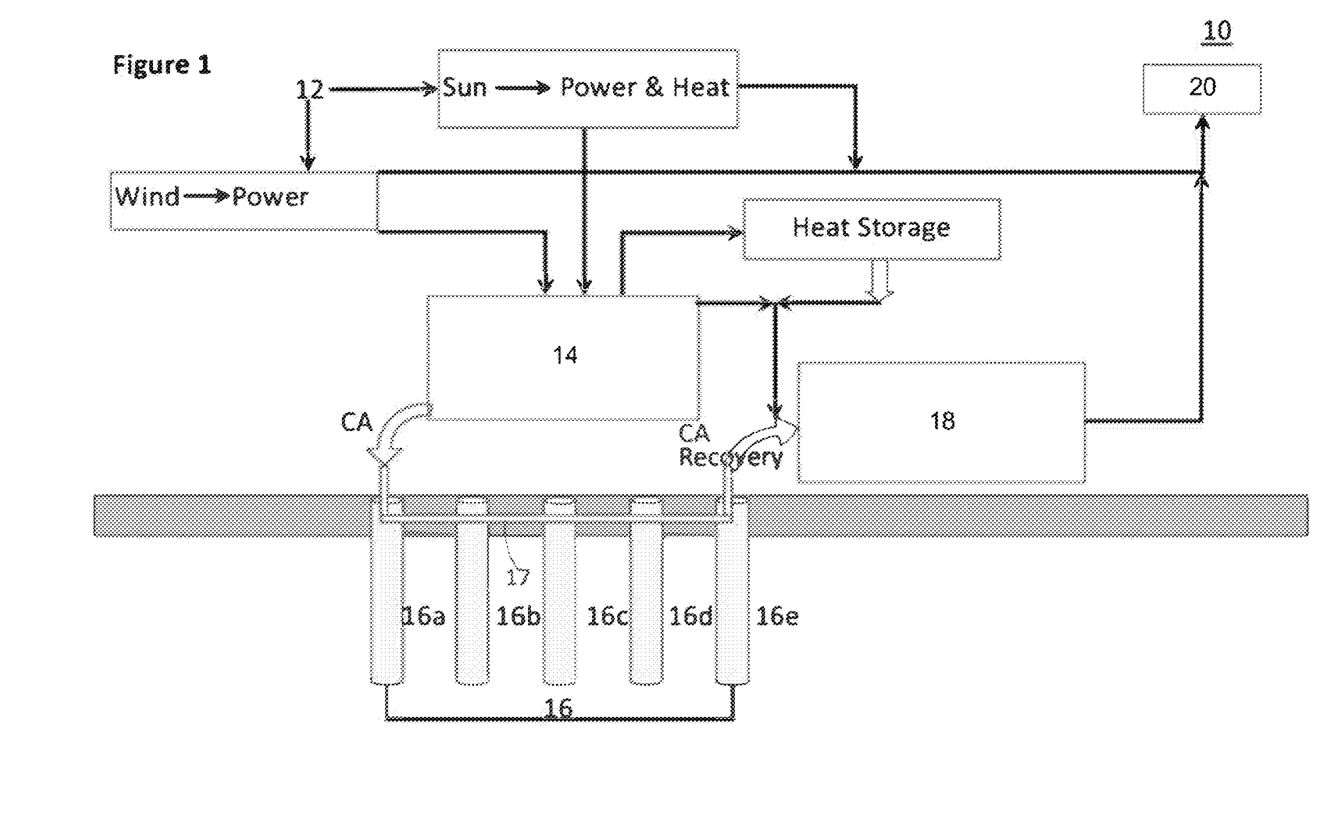
FIG. 1 is a block diagram of an exemplary energy storage system, according to an embodiment of the present application.

FIG. 1 illustrates an exemplary CWCAS system 10 for storing energy in the compressed air, according to an embodiment of the present disclosure. The system 10 may include an energy source 12, at least one air compressor 14 for producing compressed air using the energy from the energy source 12, at least one storage vessel 16 for storing the compressed air, and at least one air expander 18 for generating energy 20 from the compressed air released from the storage vessel 16. Surface facilities on the ground may be used to house the air compressor 14 and the air expander 18, and/or other associated components of such equipment and the storage vessel 16; including piping and valves used on the above surface portion of the storage vessel 16.

In the example of FIG. 1, the energy source 12 may be wind energy generated from a wind farm or solar energy generated from a solar farm. The energy source 12 may also be other traditional or renewable energy source, such as natural gas generators, hydro energy, tidal energy, or geothermal energy. The energy source 12 may directly supply energy to consumers for use. For example, the energy source 12 may generate electricity and directly supply it to a utility grid for nearby industrial or residential consumers for use. The energy generated by the energy source 12 may also be converted to other forms for storage, such as compressed gas, including air. Air is used as the examples in this disclosure, but other gases, such as flue gas or $CO_2$, may also be used.

In the present application, the air compressor 14 may generate compressed air using the energy supplied from the energy source 12. In some examples, when the electricity generated by the energy source 12 is more than the needs of consumers, or when consumers do not need the electricity generated by the energy source 12 at certain period of time, such as at the middle of the night, the extra electricity generated by the energy source 12 may be used to power the air compressor 14 for generating compressed air. In this case, the electricity generated by the energy source 12 may be converted to the energy stored in compressed air.

The air compressor 14 needs to have specifications to achieve the desired energy storage capacity of the CWCAS system for a given application. In an embodiment, the air compressor 14 may require an energy supply of 173 to 216 kW, have an operating pressure range of 1750 to 7250 PSI (12 to 50 MPa), and a flow rate of 341 to 344 Standard Cubic Feet per Minute (SCFM).

Figure 3:
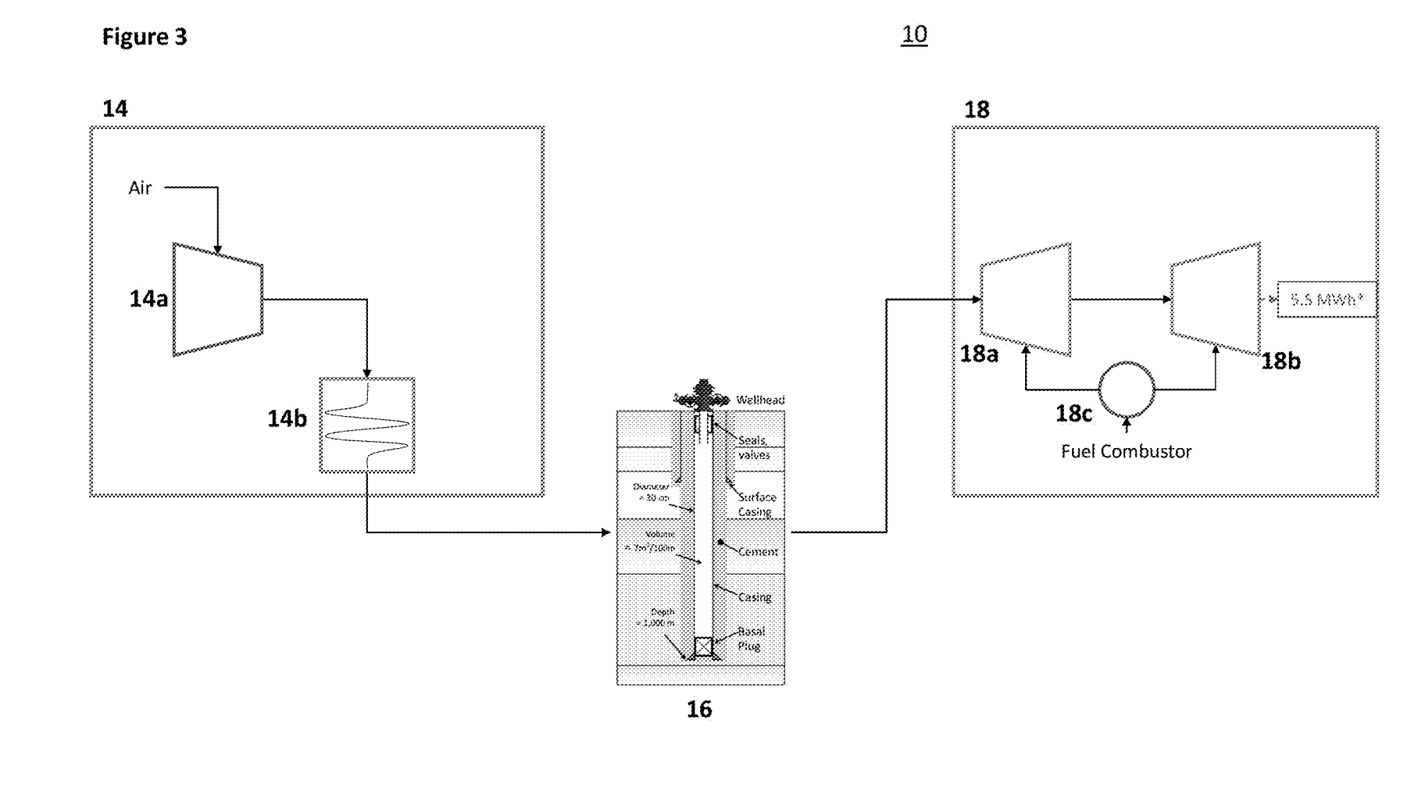
FIG. 3 is a block diagram of an exemplary energy storage system, according to another embodiment of the present application.
Figure 4:
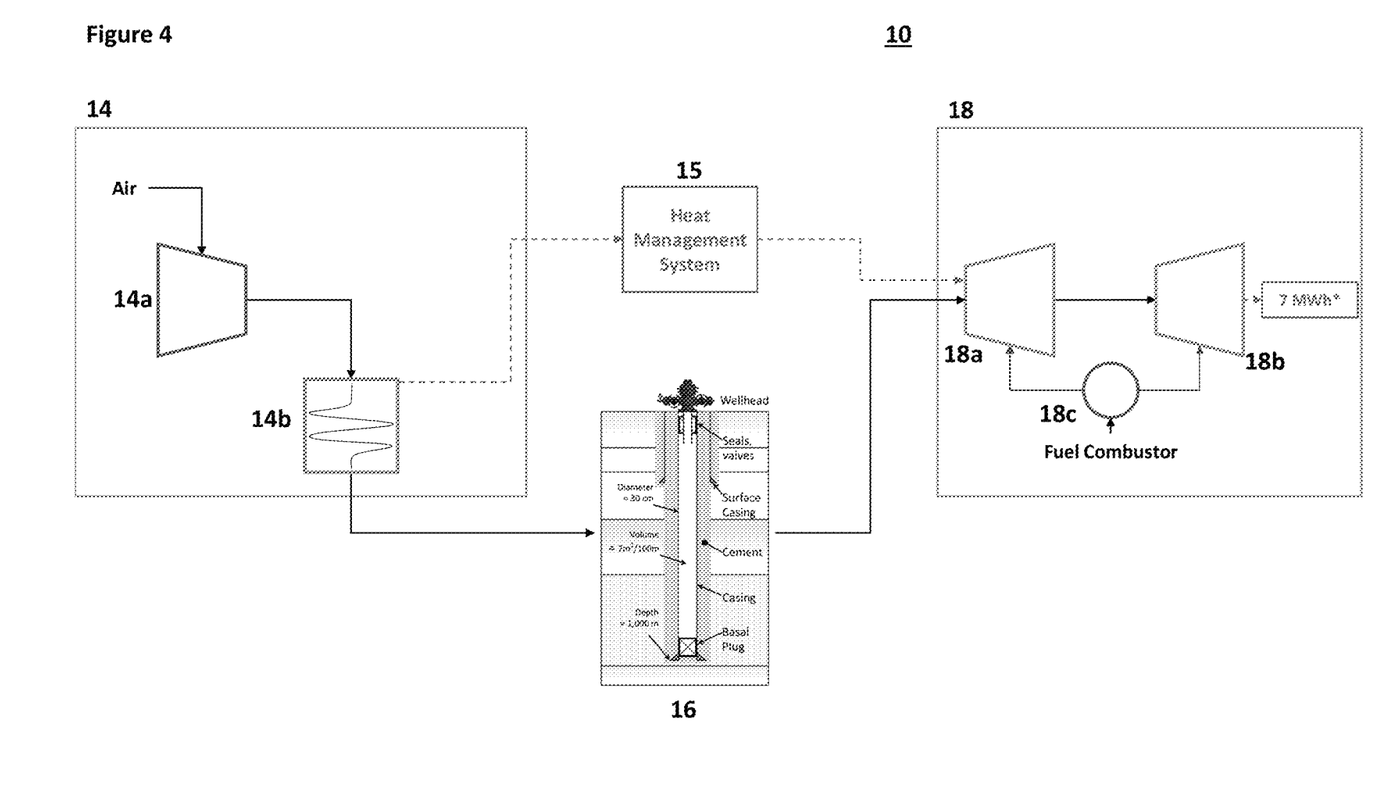
FIG. 4 is a block diagram of an exemplary energy storage system, according to another embodiment of the present application.

As illustrated in the examples of FIGS. 3 and 4, the air compressor 14 may include a compressor 14a. In some examples, the air flow input into the air compressor 14a may have a flow rate of 0.151 kg/s, a volume flow rate of 0.149 $m^3$/s, a pressure of 0.1 MPa and a temperature of 30° C. The compressed air flow output from the air compressor 14a has a flow rate of 0.151 kg/s, a volume flow rate of 0.003 $m^3$/s, a pressure of 50 MPa and a temperature of 250° C. Therefore, the air compressor 14 increases the pressure and the temperature of the air during the compression process, and heat is generated during the air compression process. As such, the energy, such as electricity, from the energy source 12 is substantially converted to heat and the mechanical energy stored in the compressed air.

In some examples, the compressed air flow output from the air compressor 14a may be directly injected into and stored in the storage vessel 16 without cooling the air.

If the compressed air has a high temperature, the temperature of the air stored in the storage vessel 16 is reduced in given storage volume at a given pressure. As well, a high temperature may accelerate the corrosion speed of the casing materials of the storage vessel 16. In some examples, as shown in FIGS. 3 and 4, the air compressor 14 may further include an intercooler 14b for reducing the temperature of the compressed air to a desired temperature by capturing the heat generated from the air compression process. The intercooler 14b may be a mechanical device used to cool the compressed air, such as a heat exchanger that removes some of the heat from the compressed air. The compressed air flow output from the compressor 14a may flow into the intercooler 14b and flow out from the intercooler with a flow rate of 0.151 kg/s, a volume flow rate of 0.003 m³/s, a pressure of 50 MPa (or 7250 PSI) and a temperature of 200° C. As such, the intercooler 14b decreases the temperature of the compressed air and removes some of the heat from the compressed air. The heat captured by the intercooler 14b may be used as heat for other processes, such as to heat the compressed air discharged from the storage vessel 16 in the air expansion stage to be described below, via a heat management system 15 in FIG. 4. The heat management system 15 may include a heat sink for heat storage. In some examples, the heat captured by the intercooler 14b may be used to heat buildings or for other beneficial uses. The heat management system 15 may be housed in the surface facilities described above.

The compressed air output from the air compressor 14 may be input to one or more storage vessels 16 for storage. The air compressor 14 is in a sealed, fluid communication with one or more of the storage vessels 16. For example, the compressed air may flow from the air compressor 14 to one or more of the storage vessels 16 in one or more air-tight pipes, such as metal pipes. The storage vessel 16 may include an array of storage vessels.

Figure 2:
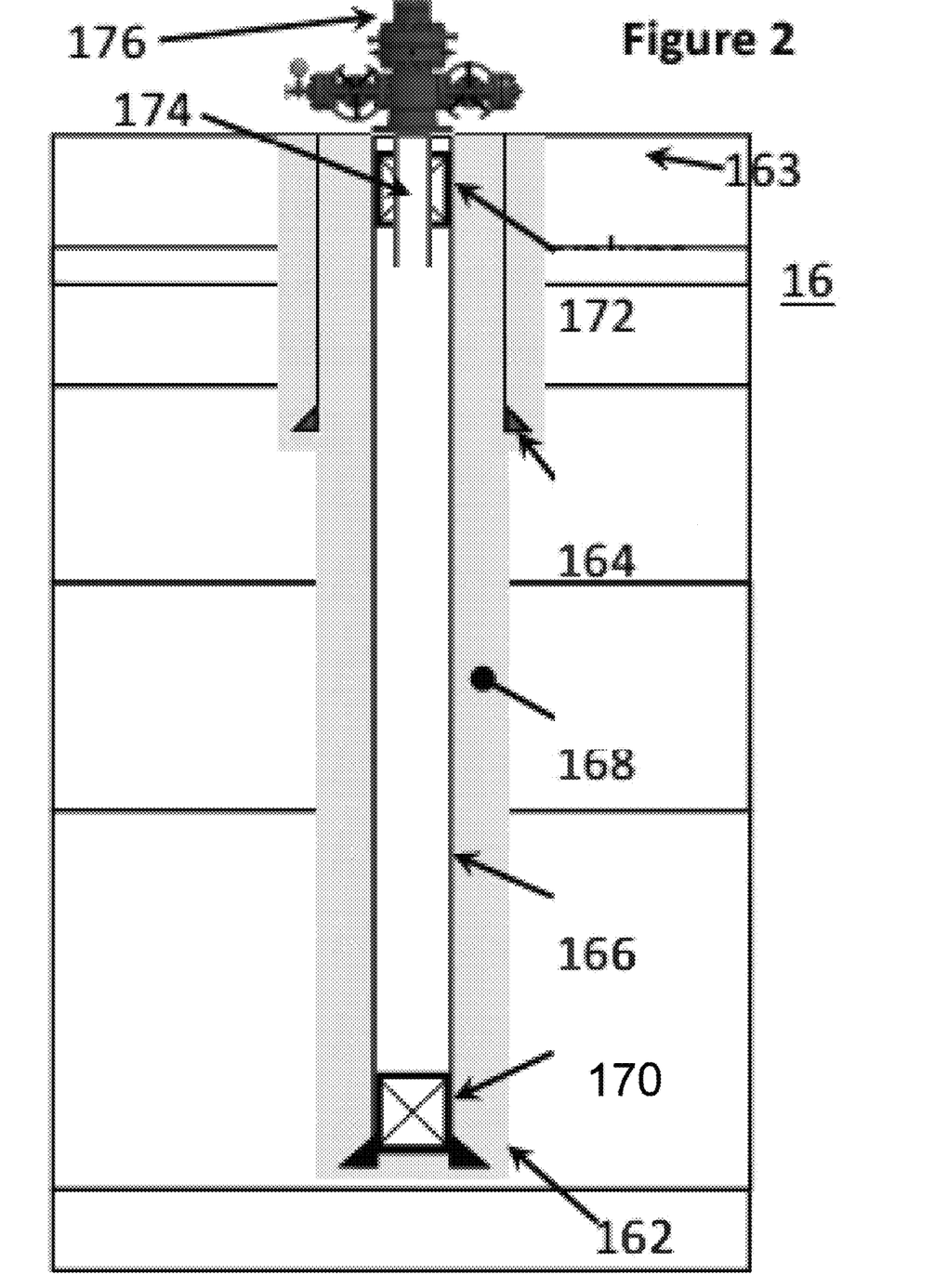
FIG. 2 is a cross sectional view of a storage vessel, according to an embodiment of the present application.

FIG. 2 illustrates an exemplary storage vessel 16 which may be a wellbore 162 cased with material that can sustain high pressure and high temperature. For example, the wellbore 162 may be cased with a casing 166 made from high grade steel; such casing in a wellbore is cemented 168 in place to the surrounding rock formations. In a preferred embodiment, such wellbore casing 166 is a high grade steel rated to high pressure (up to 100 MPa) and high temperature (up to 200° C.).

In the example of FIG. 2, the storage vessel or the well 16 includes a wellbore 162 encased by a casing 166 made from material that can sustain high pressure and high temperature and cement 168 as described previously. In the example of FIG. 2, the wellbore 162 may be a vertical wellbore formed by drilling into subsurface formations 163. The storage vessel 16 may be a high pressure-high temperature (HP-HT) well by drilling the wellbore 162 to a depth, such as at least 500 meters and casing the well with HP-HT rated casing 166 and cement 168. In some examples, the well 16 may have a depth of up to 1500 meters. The depth of a well can vary depending on the volumetric capacity of the well required for energy storage specifications in a given application. In an embodiment the well 16 has a depth of at least 500 m to 1500 m. In some examples, multitude sections of casing 164, 166 may have progressively smaller diameter casing as the wellbore length is extended.

The wellbore 162 may be drilled in substantially any type of rock or sediment. Oilfield rotary drilling technology may be used to drill a HP-HT wellbore in sedimentary rock. Air hammer drilling may be used to drill a HP-HT wellbore, providing for more rapid drilling in dense, low permeability rocks such as granites or very dense sediments.

Cement 168 is designed for the temperature and pressure range of the CWCAS operation, for example based on mathematical modeling of casing 166 and the stiffness of the rock mass. The casing 166 and the cement 168 are corrosion resistant.

Due to the depth of the well 16 in the subsurface formations 163, the compressed air stored within the well 16 may be able to maintain the temperature around 200° C. at a well depth of up to 1500 meters.

An air-tight basal plug 170 may be installed at the bottom end of the casing 166 and an air-tight top seal or valve 172 may be installed at the top portion of the casing 166, for example at 20-50 meters beneath the ground surface. The casing 166, the basal plug 170, and the top seal 172 define an air-tight volume or space for storing the compressed air within the well. In some examples, the basal plug 170 may be omitted and the casing 166 is otherwise sealed at the bottom end. The top seal 172 is configured to accommodate tubing 174 through which the compressed air may be injected into or discharged from the storage vessel 16. In an example, the tubing 174 may have a diameter of 15 cm or less.

A high pressure wellhead 176 caps the casing 166 and the tubing 174. The wellhead 176 is designed to allow the injection of the compressed air into the well 16 and discharge the compressed air from the well 16. The tubing 174 is air-tightly connected to the wellhead 176. The wellhead 176 may be a manifold having one or more valves or air flow regulators that allows the storage vessel 16 to be properly managed. In some examples, the manifold may, for example, by turning on or off the valves, selectively allow the compressed air from the air compressor 14 to inject into the well 16 through the tubing 174 for storage. In some examples, the manifold 176 may, for example by turning on or off the valves, selectively allow the stored compressed air to be discharge from the storage vessel, through the tubing 174, from the well 16 to the air expander 18.

Because of the in situ confinement, the casing 166 may take pressures up to 100 MPa with negligible safety risk because the entire storage vessel 16 is under the ground, and since the top seal and the safety valves are located below the ground surface, for example at about 25 meter depth. If any rupture took place, pressure would simply dissipate the air into the surrounding rock mass with no environmental impact.

In some examples, the storage vessel 16 may have a life cycle of 20-30 years.

In some examples, the internal diameter of the casing 166 is about 30 cm. The diameter of the casing of the well can vary depending on the volumetric capacity of the well 16 required for energy storage specification in a given application. In an embodiment, the volumetric capacity of the well 16 is 7 m³ per 100 meter length of the well 16 with a total depth of 1000 m, with an air pressure of 50 MPa and a temperature of 200° C. In this example, each storage vessel or well 16 may store compressed air that may store up to 10 MWh of energy for electricity generation. In one example, the energy stored in the compressed air with a conservative pressure of 25-50 MPa stored at 200° C. in a single storage vessel or well 16, which casing 166 has a diameter of 30 cm and a depth of about 1000 meters, may be in the order of 5-10 MWh of energy.

The amount of energy stored in the compressed air in one storage vessel 16 depends on the volume of the well 16, and pressure range of the compressed air stored therein. The temperature of air is also critical in energy production. The temperature range of storage is from 50-250° C. The total volume of the well 16 may typically be 20-100 m³, the depth of the well 16 may be up to 2000 meters, the pressure of the compressed air stored in the well 16 may be 5 MPa to 100 MPa, and the temperature of the compressed air stored the well 16 may be 50° C. to 250° C. Although in these examples, the storage vessel 16 is assumed to be vertical in orientation, the actual well profile may be inclined or horizontal as required by a particular application. The volume and depth of the well 16 can vary accordingly.

In an embodiment of the CWACS system, the pressure of the storage vessel 16, the charge time, and the energy stored in the storage vessel 16 of an air compressor 14 are shown in the table below:

| Initial Pressure of the Vessel (MPa) | Final Pressure of the Vessel (MPa) | Charge Time (hours) | Total Energy Stored in the Vessel(kWh) |
|---|---|---|---|
| 0 | 50 | 47 | 10000 |
| 20.6 | 50 | 28 | 6100 |
| 30 | 50 | 19 | 4100 |

The total energy store in the storage vessel 16 refers to the energy of the compressed air injected into the storage vessel 16 from the initial pressure to the final pressure of the storage vessel 16. The charge time of a given well can is also dependent on how many and the specifications of the compressors equipment being used in the CWCAS system.

In some examples, the air compressor 14 may include two or more units of the air compressors to compress the air at the same time. As such, the charge time of the vessel 16 to a desired pressure may be reduced. For example, if two compressor units compress the air simultaneously, the charge time may be reduced substantially by half. As well, the charge time may be reduced if the air compressor 14 has a larger processing capacity, such as a faster flow rate.

In some examples, when one storage vessel 16 is insufficient to store the energy generated by the energy source 12, the system 10 may expand the energy storage capacity by adding more wells or storage vessels 16. As illustrated in the example of FIG. 1, the storage vessel 16 may include an array of wells 16a, 16b, 16c, 16d, and 16e for storing the compressed air. In this case, any series of the adjacent wells 16a, 16b, 16c, 16d, and 16e are in hydraulic communication with each other, for example, by a manifold 17. Due to the fluidity of the compressed air in the wells 16a, 16b, 16c, 16d, and 16e, the air pressure in these wells can be substantially the same. One or more wells 16a, 16b, 16c, 16d, and 16e may have a tubing 174 to allow the compressed air to be injected into or to discharged from the array of the storage vessels 16. Where the system 10 includes an array of wells as a storage vessel 16, the compressed air may be injected into or discharged from at least one or any combination of the wells 16a, 16b, 16c, 16d, and 16e. The system 10 allows for concurrent charging and discharging of compressed air with a storage vessel 16 comprising an array of wells 16a, 16b, 16c, 16d, and 16e. In this example the number of wells in the array is five wells, for illustrative purpose. The actual number of wells can be higher or lower depending on a design of a given energy storage project.

As an array of storage vessels has a larger capacity to store the compressed air, the total energy stored increases, and as a result, the compressed air is more likely dispatchable based on the energy demands of the end user 20. As such, the array of storage vessels has advantages of optimized use in terms of energy dispatchability, energy output and cost savings. For example, if cheap excess wind energy is available, compression and energy generation may occur at the same time, converting irregular energy of lower value into smooth energy of higher value. Furthermore, the heat generated during the compression process may be directly used to heat the discharged compressed air in the air expansion process to be described below, and the system 10 may dispatch the compressed air in the array of storage vessels to generate electricity in a smooth manner based on the demands.

When energy stored in the compressed air in the storage vessel 16 needs to be converted to other forms, such as electricity, the compressed air may be discharged from the storage vessel 16. In an embodiment, the compressed air discharged from the storage vessel 16 and flowed into the air expander 18 has a flow rate of 0.302 kg/s, a volume flow rate of 0.005 m$^3$/s, a pressure of 50 MPa (or 7250 PSI) and a temperature of 200° C. If the flow rate of the compressed air injected into the storage vessel 16 is 0.151 kg/s, the charge time to discharge time ratio is 2:1. The actual charge-time to discharge-time ratio may be adjusted based on project requirements and the types of the compressor 14 and expander 18 selected.

The air expander 18 is in fluid communication with the storage vessel 16. In some examples, the energy stored in the compressed air may be used to generate electricity, by the air expander 18. The air expander 18 may be selected based on the energy delivery requirements, heating conditions of the system 10 to be discussed below. The air expander 18 may include multiple stages of expansion and reheating; and the expander system 18 incorporates a turbine 18a and 18b for the generation of electricity. In the expander system 18, as the high-pressure gas flows from the high-pressure stream into the expander, the gas spins a turbine, which is coupled to a generator that produces electricity. This turbine is typically connected with a crank shaft to a generator. However the expander-turbine system 18 is typically an integrated equipment system. The expander system 18 is chosen to handle the high pressures needed for the CWCAS method. The air expander 18 needs to have specifications to achieve the desired energy output capacity of the CWCAS system for a given application.

In the examples illustrated in FIGS. 3 and 4, the air expander 18 may include a High Pressure (HP) turbine 18a and a Low Pressure (LP) turbine 18b coupled to the HP turbine 18a. The high pressure compressed air discharged from the storage vessel 16 expands in the HP turbine 18a and, as a result of the air expansion, rotates the HP turbine 18a. The expanded air from the HP turbine 18a then further expands and drives rotation of the LP turbine 18b. The rotation of the HP and LP turbines 18a and 18b generates electricity. The air expander 18 may have other configurations, for example including more turbines, such as one or more intermediate pressure turbines, between the HP and LP turbines. The expansion of air (from high pressure to low pressure) in the turbines consumes heat. To avoid freezing the turbines, the air in the turbines needs to be reheated. As well, reheating the air in the turbine to increase the temperature of the air also increases the expansion effects of the air in the turbines, and thus increases the efficiency of the electricity generation. In some examples, by reheating the compressed air in the turbines, the round-trip efficiency may be increased, for example by 25%.

In some examples, the air expander 18 may operate at a constant flow rate of the compressed air discharged from the storage vessel 16. In some examples, for industrial use, the system 10 may store the compressed air in the storage vessel at a lower pressure, such as 10-25 MPa, and the expander 18 may be selected to operate in the selected pressure range.

In some examples, the system 10 may be a diabatic or an adiabatic system. In a diabatic system, the heat generated in the air compressor 14 during the compression process is not used in the air expansion process, but may be used beneficially for other purposes.

In a diabatic system configuration, the system 10 may include a combustor 18c to heat the air used in the HP and LP turbines 18a and 18b. As illustrated in the example of FIG. 3, when the system 10 is a diabatic system, the stored energy in the compressed air may be released from the storage vessel 16. The compressed air is heated by the combustor 18c through combustion, for example by natural gas or fuel. The heated air may be expanded in HP and/or LP turbines 18a and 18b to generate electricity, as previously described.

In an embodiment, the temperature of the air decreases as the air expanded in the turbines 18a and 18b. In some examples, the air discharged from the HP turbine 18a may have a flow rate of 0.302 kg/s, a volume flow rate of 0.005 m³/s, a pressure of 15 MPa and a temperature of 100° C. In this case, the air expander 18 may generate electricity up to 5.5 MWh if the fuel flow rate supply to the combustor 18c to reheat the air in the turbines 18a and 18b is 0.03 kg/s. Therefore, the round trip efficiency of air expander 18 in the diabatic system illustrated in FIG. 3 is about 55%, which is the ratio of the energy generated from the air expander 18 over the energy stored in the storage vessel 16, for example 10 MWh.

If the diabatic system has a 55% round-trip efficiency, the table below shows exemplary parameters of the diabatic system illustrated in FIG. 3 in different pressurization scenarios:

| Initial Pressure of the Vessel (MPa) | Final Pressure of the Vessel (MPa) | Discharge Time (hours) | Total Produced Energy (kWh) | Round-trip Efficiency |
|---|---|---|---|---|
| 50 | 0.09 | 24 | 5500 | 55% |
| 50 | 20.6 | 14 | 3400 | 34% |
| 50 | 30 | 9.5 | 2300 | 23% |

Electricity of 1 MWh may support the electricity needs of about 300 Canadian homes for one hour. The total energy produced by the expander 18 may vary based on the type of the expander 18 or turbines and the pressure drop after the air passes each turbine. In some examples, if the diabatic system includes an array of 4 storage vessels 16, the system may store compressed air capable to generate energy up to 22 MWh (5.5 MWh×4).

As illustrated in the example of FIG. 4, when the system 10 is an adiabatic system, the heat generated during the air compression process at the air compressor 14 may be stored in a thermal storage medium, such as a heat sink, of the heat management system 15. In the process of air expansion, the heat stored in the heat storage medium may be retrieved for heating the air used in the turbines in the air expander 18. External heat may also be supplied by external heating sources, such as a combustor 18c, to heat the air used in the turbines in the air expander 18, so that the air may be heated to higher temperature for generating more energy. In some examples, when the air compression and the air expansion are conducted at the same time, the heat generated by the air compression process by the air compressor 14 may be directly supplied to the air used in the turbines in the air expander 18.

In some examples, with the heat management system 15, some of the heat generated from the compression process may be stored in the well 16 as part of the well charging process. Some of the generated heat may also be put to other beneficial use, for example, in space heating. Some heat may be used to heat the air during the air expansion process at the air expander 18. Heat management provides higher round-trip efficiencies. It is also possible to recover waste heat from another source process, and use this heat to warm the air during the CWCAS air expansion process to avoid freezing of the turbines and to increase the energy output. With heat management, round-trip efficiencies of the CWCAS system 10 may be on the order of 70%.

In an embodiment, the air discharged from the HP turbine 18a may have a flow rate of 0.302 kg/s, a volume flow rate of 0.005 m³/s, a pressure of 15 MPa and a temperature of 100° C. In this case, the air expander 18 may generate electricity up to 7 MWh if the fuel flow rate supply to the combustor 18c to reheat the air in the turbines 18a and 18b is 0.03 kg/s and if the heat is also supplied from the heat management system 15. Therefore, if all the required heat in the expander 18 comes from the heat of compression 14, the system 10 is fully adiabatic and the round-trip efficiency of air expander 18 in the adiabatic system illustrated in FIG. 4 is about 70%; which is the ratio of the energy generated from the air expander 18 over the energy stored in the storage vessel 16, for example, 10 MWh.

If the adiabatic system has about 70% round-trip efficiency, the table below shows exemplary parameters of the adiabatic system illustrated in FIG. 4 in different pressurization scenarios:

| Initial Pressure of the Vessel (MPa) | Final Pressure of the Vessel (PSI) | Discharge Time (hours) | Total Produced Energy (kWh) |
|---|---|---|---|
| 50 | 0.09 | 24 | 7000 |
| 50 | 20.6 | 14 | 4300 |
| 50 | 30 | 9.5 | 2900 |

The total energy produced by the expander 18 may vary based on the type of the expander 18 or turbines, and the pressure drop after the air passes each turbine. In some examples, if the adiabatic system includes an array of 4 storage vessels 16, the system may store compressed air capable to generate energy up to 28 MWh (7 MWh×4).

The discharge time of a well(s) is also dependent on how many expanders 18 are used, and the specifications of the expander equipment used, in the CWCAS system 10. In some examples, the system 10 may include more than one air expander 18 to increase the electricity generation capacity. In some examples, the compressor 14 and the air expander 18 may comprise an integral unit.

Therefore, CWCAS system 10 greatly improves renewable energy quality, changing renewable energy from an irregularly variable and intermittent source to a smooth, frequency-regulated and dependable energy source.

As described above, the storage vessel 16 of system 10 has a life cycle of 20-30 years, which is longer than the equivalent battery energy storage life cycle of about 7 years.

As well, CWCAS system 10 has a significantly lower environment impacts than the equivalent battery energy storage system. Battery production uses large amounts & wide range of raw materials, including metals and nonmetals (Li, Pb, Ni, Hg, Cd, Cr etc.), which present risks for public health and the environment. Battery industry can generate considerable amounts of environmental pollutants during life-cycle, including hazardous waste and greenhouse gas emissions during different processes such as mining, manufacturing, use, transportation, storage, treatment, disposal and recycling. Energy consumption for current battery production is estimated from 350 to 650 MJ/kW h. Studies indicate GHG emissions for current battery production is estimated to be between 120 and 250 kg $CO_2$-eq/kW h. Battery use at a large scale or grid-scale (>50 MW) will have significant environmental impacts. There are legitimate concerns that large-scale battery energy storage systems are not environment friendly and not sustainable.

In contrast, CWCAS system 10 provides an advanced type of Compressed Air Energy storage solution: system 10 provides an alternative energy storage option for bulk energy management, and has low Cradle-to-Grave environmental impact; system 10 may increase renewable energy supply in electrical generation systems. The system 10 is compatible with geothermal, wind and solar energy generation, and compatible with grid, off-grid systems and micro-grid applications.

The CWCAS system 10 may be conveniently deployed to meet the energy needs of a geographic area and/or application. The system 10 may easily be customized and flexibly scaled to allow local communities to self-regulate their energy sources, as their needs require. The configuration of system 10 may be based on local needs. Based on the capacity of the energy source 12 and the needs of the area/application, suitable type and size of air compressor 14 and the air expander 18 systems may be selected. The configuration of the storage vessel 16, including the depth of the well, the diameter of the casing 166 may also be selected to provide the volume, mass, temperature and pressure of the stored compressed air to be compatible with the capacity of the of air compressor 14 and the air expander 18. As described above, additional storage vessels 16 may be created in the subsurface to expand the storage capacity of the compressed air, for example, by drilling and tying-in additional storage vessels.

As well, the CWCAS system 10 is not site specific and may be located almost anywhere in any environment. For example, system 10 may be deployed in remote communities or for use in industrial applications. On the other hand, other compressed air storage systems that use salt caverns, water bladders, etc., are limited to the location of the salt caverns or water bladders. The system 10 may also be installed at a suitable scale, and easily expanded to provide increased energy storage capacity based on future growing needs through the drilling of additional storage vessels 16. For example, the system 10 has the flexibility to be located near, and tied into, existing/legacy electricity transmission infrastructure to service larger markets; and reduce the need/cost for building new electricity transmission systems.

The system 10 may be used in various applications, including industry, oilfield, and utilities. For example, the system 10 may convert oilfield wells to energy storage vessels 16 by using the existing wells of the oilfields as storage vessels, with suitable modifications to seal such wells. The flare gas (from upstream petroleum activities, for example) may be used as an energy source 12 to drive the compressor 14, or in heating the air in the turbines of expander 18. As well, in peak management of energy supply, the system 10 allows the storing of excess energy in the storage vessel 16 for future beneficial use; such as by generating electricity, and provides arbitrage opportunity with a grid provider, by selling the electricity at the peak hour of electricity consumption.

Certain adaptations and modifications of the described embodiments can be made. Therefore, the above discussed embodiments are considered to be illustrative and not restrictive.

The invention claimed is:

1. A system for storing energy in a form of compressed gas for generation of electrical energy, comprising:
   one or more energy storage vessels for storing compressed gas, said energy storage vessels each provided in a subsurface, wherein surrounding rock layers of the subsurface provide stiffness and in situ confining stress to said storage vessel;
   a casing placed within the storage vessel and cemented to surrounding rock layers which provide in situ confinement to said casing, the casing defining a volumetric space for storing the compressed gas;
   at least one gas flow regulator sealed at a top end of the casing for selectively injecting the compressed gas into the space or discharging the compressed gas from the volumetric space;
   at least one surface gas compressor in sealed, fluid communication with the one or more energy storage vessels for compressing the gas and for injecting the compressed gas therein; and
   at least one surface gas expander system in sealed, fluid communication with the one or more energy storage vessels for generating electricity from the compressed gas discharged from one or more energy storage vessels wherein the storage vessel stores in a charging process at least a portion of heat being generated during a compression process of the gas, the portion of the heat to be used for heating the compressed gas in the subsequent expansion process for generation of the electrical energy, wherein the compressed gas stored in the storage vessel has a pressure up to 100 MPa and a temperature up to 350° C., and wherein the system is configured to provide a round-trip energy storage efficiency capacity of 23%-70%.

2. The system of claim 1, wherein the one or more energy storage vessels comprise a plurality of energy storage vessels and any adjacent energy storage vessels are in fluid communication with each other.

3. The system of claim 2, where the plurality of energy storage vessels form an array that is in fluid connection to collectively provide a cumulative storage capacity for energy storage.

4. The system of claim 2, wherein a total volume of the storage vessel is 50-100 m$^3$.

5. The system of claim 1, wherein the compressed gas is air.

6. The system of claim 1, wherein an effective volume capacity of the storage vessel is 1-8 m$^3$/100 meter of cased storage vessel length.

7. The system of claim 1, wherein the surrounding rock formations store the portion of heat.

8. A method for energy storage for generation of electrical energy, comprising:
   forming at least one storage vessel by cementing a casing in the at least one storage vessel in a subsurface;
   providing, from surrounding rock layers of the subsurface, in situ confining stress to said storage vessel;
   compressing gas on a surface using a renewable energy source; and
   storing at least a portion of heat generated from compression of the gas in the at least one storage vessel, wherein the compressed gas stored in the storage vessel has a pressure up to 100 MPa and a temperature up to 350° C., and wherein the energy storage provides a round-trip energy efficiency capacity of 23%-70% for generation of the electrical energy.

9. The method of claim 8, further comprising:
discharging the compressed gas from at least one storage vessel; and
expanding the said discharged compressed gas in an expander system for generating electricity; and
heating at least in part the compressed gas in the expander system using the portion of heat stored in the storage vessel.

10. An energy storage system for storing compressed gas, comprising:
a storage vessel provided in a subsurface comprising surrounding rock layers, the surrounding rock layers having geomechanical properties that provide stiffness and in situ confining stress to said storage vessel; and
a casing placed within the storage vessel and cemented to surrounding rock layers for providing in situ confinement from the surrounding rock layers due to stiffness of the rock mass, the cased storage vessel defining a volumetric space for storing the compressed gas generated from a renewable energy source,
wherein the storage vessel stores at least a portion of heat in a charging process, for heating the compressed gas in a subsequent expansion process for generation of the electrical energy, the portion of heat being generated during a compression process of the compressed gas,
wherein said confining stress provides in part pressure and temperature conditions for gas storage in said storage vessel, and
wherein the compressed gas stored in the storage vessel has said pressure up to 100 MPa and said temperature up to 350° C., and wherein the energy storage system has a round-trip energy efficiency capacity of 23%-70%.

11. The energy storage system of claim 10, wherein at least one gas flow regulator sealed at a top end of the casing for selectively injecting the compressed gas into the space or discharging the compressed gas from the volumetric space for generating electrical energy.

12. The energy storage system of claim 10, wherein an effective volume capacity of the storage vessel is 1-8 m$^3$/100 meter of storage vessel length.

13. The energy storage system of claim 12, wherein a total volume of the storage vessel is 50-100 m$^3$.

14. The energy storage system of claim 10, wherein the stored compressed gas has temperature of 50° C. to 350° C.

15. The energy storage system of claim 10, wherein the casing further comprises multitude sections comprising progressively smaller diameter casing as a storage vessel length is extended.

16. The energy storage system of claim 10, wherein the compressed gas is compressed air.

17. The energy storage system of claim 16, wherein the storage vessel stores the compressed air that stores on an order of 5 MWh or more of energy for electricity generation.

18. The energy storage system of claim 10, wherein the storage vessel has a volumetric capacity of 7 m$^3$/100 m of length, a depth of 1000 meters, and a total volume of 70 m$^3$.

19. The energy storage system of claim 10, wherein the storage vessel is used in an adiabatic system for storing energy in the compressed gas for generation of electrical energy.

* * * * *